Oct. 6, 1931.  R. N. EHRHART  1,826,422
APPARATUS FOR MEASURING FLUIDS
Filed Feb. 11, 1925
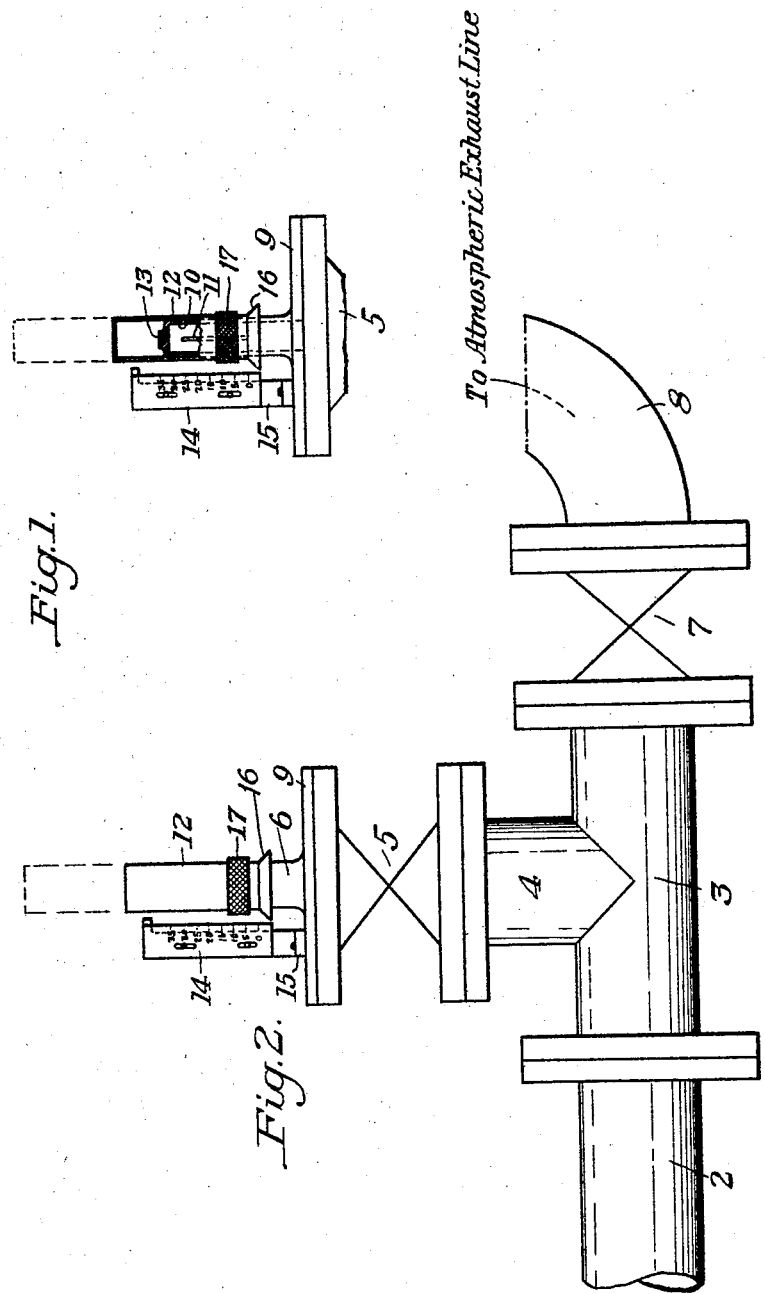
INVENTOR
Raymond N. Ehrhart,
by Byrnes, Stebbins & Parmelee
his Attys.

Patented Oct. 6, 1931

1,826,422

UNITED STATES PATENT OFFICE

RAYMOND N. EHRHART, OF EDGEWOOD, PENNSYLVANIA, ASSIGNOR TO ELLIOTT COMPANY, OF PITTSBURGH, PENNSYLVANIA, A CORPORATION OF PENNSYLVANIA

APPARATUS FOR MEASURING FLUIDS

Application filed February 11, 1925. Serial No. 8,430.

The present invitation relates broadly to apparatus for measuring fluids, and more particularly to apparatus of this character in the form of a meter, adapted for use in condensing systems or the like, for the purpose of accurately determining the air leakage, although the utility of the invention is not limited in this respect.

To maintain surface condensers at their best performance requires accurate operation and close attention on the part of the operators, the performance depending upon a number of conditions. Among these conditions, the question of air leakage plays an important part, the efficiency of the system falling off rapidly as the air leakage increases. It has heretofore been proposed in the art to which the present invention relates to provide means for continuously determining the rate of discharge of air from the condenser for thereby showing the amount of air leakage. Such apparatus, however, has not been altogether satisfactory, for the reason that under varying conditions of pressure, the movable indicating body has oscillated in such manner as to make accurate reading or determination extremely difficult. Also, where the conditions of operation are such as not to cause oscillation of the indicating member, there exists what is known as the friction of rest, this friction being much greater than the friction of motion. By reason of this friction of rest, when the rate of flow changes, the indicating part of the mechanism is caused to lag behind, thereby interfering with an accurate reading.

Further objections have also arisen from the fact that the measuring apparatus heretofore used has constituted the main escape for the air. With such an installation, in the event of failure of the water supply to the condenser, the apparatus has not been able to efficiently pass the amount of steam discharged from the ejector or pump, thereby resulting in an undesirable and objectionable back pressure.

In accordance with the present invention, there is provided air leakage indicating means which is preferably intermittently utilized to determine the conditions of operation, and which is supplemental to the usual atmospheric exhaust, whereby upon failure of the water supply to the after condenser, such means will not be called upon to handle all of the steam discharged by the ejector or other withdrawing means.

The invention has for other of its objects the provision of means of the character referred to, so constructed that oscillation, due to varying pressure conditions, are minimized, thereby enabling accurate and easy readings to be taken at any desired moment.

In accordance with the present invention there is also preferably provided means for overcoming the friction of rest between the movable or indicating member and the stationary parts of the apparatus, thereby enabling accurate readings to be taken at any time, irrespective of what changes in the condition or rate of flow may take place.

In the accompanying drawings there is shown for purposes of illustration only a preferred embodiment of the present invention and the method of utilizing the same, it being understood that the drawings do not define the limits of my invention as changes may be made in the construction and operation therein disclosed, without departing either from the spirit of the invention or the scope of my broader claims.

In the drawings:

Figure 1 is a view partly in side elevation and partly broken away, illustrating one form of air meter embodying the present invention; and Figure 2 is a side elevational view largely diagrammatic, illustrating one method of installing the meter.

In the operation of condensers, it is desirable to provide means whereby an operator may know when the minimum leakage allowed is being exceeded. In order to provide efficiently operating means for this purpose, normal conditions of operation of the condenser must be taken into consideration and the application of an indicating meter must be made in such manner that these conditions of operation will not be impaired in any respect.

In carrying out the present invention, I preferably provide the conduit 2, leading from the after condenser, not shown with a T-coupling 3, having its laterally extending arm 4 in co-operative relation to the inlet of a valve 5, the outlet of which co-operates with a meter 6. With this construction, by opening the valve 5 and closing the valve 7 the meter may be brought into operation to enable the desired readings to be taken. The meter preferably comprises a base 9, adapted to directly co-operate with the flange of the valve 5, this base being formed with an upwardly projecting guide 10, preferably in the form of a hollow cylinder having one or more laterally extending openings 11. These openings 11 may conveniently be in the form of slots, although it will be apparent that closely adjacent openings may be utilized for the same purpose. The slots are preferred, however, due to the fact that they may be formed of constant widths, thereby providing discharge areas directly increasing in predetermined manner as they are uncovered.

Slidably mounted on the guide 10 is a bell or piston 12, having a close fit with the guide and adapted to normally slide downwardly thereover under the influence of gravity. The bell 12 is formed with a closed outer end, while the guide 10 is provided with a small opening 13 through which pressure is transmitted to the interior of the bell for raising the same to uncover the opening or openings 11. With this construction, the interior of the bell is subjected to the pressure which exists in the conduit 2.

On account of the constant weight of the bell, a constant back pressure of minute volume is imposed on the conduit 2. With this construction, as the amount of air varies in the conduit, the bell will rise or fall, covering or uncovering a proportionate amount of the opening or openings 11. Inasmuch as the back pressure imposed by the weight of the bell is constant, the opening or openings 11 will be uncovered exactly in proportion to the amount of air sent through the conduit.

The position of the bell 12 may in turn be used to designate the air flow by providing a scale 14, preferably adjustably mounted on a support 15 and empirically graduated in any desired manner. Conveniently, the graduations may be read directly in cubic feet of air discharged per minute, the adjustability of the scale enabling accurate positioning thereof. The bell 12 may be formed with a flared portion 16, constituting a peripherally extending pointer adapted to co-operate with the scale.

The present meter possesses inherent advantages over meters heretofore constructed and operating purely on the displacement principle, in that it embodies an efficient dashpot serving to minimize variations of movement and thereby facilitate readings. Ordinarily with an exact balance between the displaced part and the pressure of the air, any variations of the air presure or other disturbing influence will cause the displaced body to bob up and down rapidly. This is prevented in the present construction by reason of the air caught between the bell and the upper end of the guide 10, thereby preventing the bell from rapidly changing its position with respect to the guide, the chamber within the bell 12 above the guide 10 serving exactly as a dashpot.

The bell 12 is also preferably formed with a knurled portion 17 adapted to be grasped between the fingers so that the bell may be spun or rotated about its vertical axis. By such spinning operation the friction of rest is entirely overcome at the moment of taking readings, thereby causing the bell to move acurately under variations of air flow. By reason of the peripherally extending pointer 16, the position at which the bell rests does not effect the reading of the meter.

Certain advantages of the present invention arise from the provision of a meter constructed in such manner that there is an efficient dampening of vibration or fluctuation produced by variations in fluid measure, as well as from the provision of means for insuring accuracy by overcoming the friction of rest.

Still other advantages of the invention arise from the adjustability of the indicating scale, whereby different adjustments may be made for different installations, as required.

I claim:

1. A fluid meter comprising a guide having an exhaust port, and a bell co-operating with said port and adapted to cover and uncover the same, there being a restricted communication between the interior of said guide and the interior of said bell forming a dashpot intermediate the guide and the bell, substantially as described.

2. An air leakage meter, comprising a guide member having an opening, a member carried by said guide member and cooperating with said opening, there being a restricted communication between the interior of said member and the source of air pressure, said member having a chamber which communicates with the source of pressure through said restricted communication so that said member is adapted to be movable in response to variations in air pressure, said chamber serving as a dashpot to stabilize said member, and indicating means cooperating with said member, substantially as described.

3. A fluid meter comprising a guide having an exhaust port and having a restricted opening in its outer extremity, and a bell slidably mounted upon said guide for controlling the flow through said port, said opening permitting a predetermined minimum flow to the interior of said bell to actuate the bell and form a dashpot therein, substantially as described.

4. A fluid meter comprising a guide having an exhaust port and an opening, and a bell cooperating with said opening and adapted to cover and uncover said port, said guide and bell forming a dashpot for smoothing the operation of said bell, substantially as described.

5. An air leakage meter comprising a member movable in response to variations in air pressure, a guide within said member having a discharge opening uncovered by the movement of said member and indicating means cooperating with said member, said member forming an air chamber serving with said guide to form a dashpot to stabilize said member and having a restricted communication with the source of air pressure serving as both an inlet and outlet, substantially as described.

6. A fluid meter comprising a guide having an exhaust port, a bell cooperating with said port and adapted to cover and uncover the same, there being a restricted communication between the interior of said guide and the interior of said bell forming a dashpot intermediate the guide and bell, and means on said bell facilitating the manual spinning thereof, substantially as described.

7. A fluid meter comprising a guide having an exhaust port and having a restricted opening in its outer extremity, a bell slidably mounted on said guide for controlling the flow through said port, said opening permitting a flow to the interior of said bell to actuate the bell and form a dashpot therein, and means facilitating the manual spinning of said bell, substantially as described.

8. A fluid meter comprising a guide having an exhaust port and an opening, a bell cooperating with said opening and adapted to cover and uncover said exhaust port, said guide and bell forming a dashpot for smoothing the operation of said bell, and means facilitating the manual spinning at will of said bell, substantially as described.

9. A fluid meter comprising an elongated guide having an exhaust port and having a restricted opening in one extremity, a bell slidably mounted on said guide for controlling the flow through said port, said opening permitting a predetermined flow to the interior of said bell to actuate the bell and forming a dashpot therein, and a scale cooperating with said bell.

10. A fluid meter comprising a guide having an exhaust port, and a bell cooperating with said port and adapted to cover and uncover the same, there being a restricted pressure communication between the interior of said guide and the interior of said bell, the interior of said bell forming a dashpot intermediate the guide and bell, substantially as described.

In testimony whereof I have hereunto set my hand.

RAYMOND N. EHRHART.